United States Patent Office  
3,226,244  
Patented Dec. 28, 1965

3,226,244
PROCESS FOR MAKING HIGH COLOR CARBON BLACK PIGMENTS
Merrill E. Jordan, Walpole, and John F. Hardy, Andover, Mass., assignors to Cabot Corporation, Boston, Mass., a corporation of Delaware
No Drawing. Filed Dec. 15, 1961, Ser. No. 159,786
8 Claims. (Cl. 106—307)

This invention relates to carbon black. More particularly the invention disclosed herein relates to a process for producing a superior high color carbon black which imparts especially desirable properties to enamel systems. Also included within the scope of the present invention are the products resulting from the novel process hereinafter disclosed.

The basic requirements for any color black are high jetness, easy dispersion in the appropriate vehicles and good viscosity stability in the resultant formulations. In turn, the properties of the black which are responsible for these characteristics and accordingly reflect the coloring efficiency of a black are its nigrometer scale, particle size, volatile content and to some extent, the physical nature of the surface of the particles and the chemical nature of the volatile matter thereon.

The nigrometer scale of a carbon black is a measure of the mass tone or the intenseness of jetness or blackness and is closely related to the particle size thereof. In general the lower the particle size of a carbon black, the lower its scale and the more intense is the blackness thereof. According to the recognized standards of the industry "high color blacks" are those with scales below 70, while the scales of "medium color blacks" run from about 70 to 78 and "regular color blacks" have scales from about 80 to 90. Another property of importance in color blacks is volatile content which often affects tone and color properties and usually largely determines flow properties in lacquers and/or enamels. The volatile content of a carbon black is an indication of the amount of chemisorbed oxygen and/or other gases on the surface thereof and is determined by measuring the loss of weight on calcining a dried carbon black sample in a covered platinum crucible for seven minutes at 972° C. The "regular color blacks" generally have volatile contents of no greater than about 5% by weight, whereas the volatile content is generally in the range from 5 to 10% by weight for "medium color blacks" and runs as high as 18% or more for "high color blacks."

The principal object of the present invention is to provide a superior high color carbon black pigment which is especially suitable for enamel systems.

Another object of the present invention is to provide a novel process for producing a superior carbon black pigment which is more economical than processes presently used to produce conventional high color blacks.

Another object of the present invention is to provide a process which is especially suitable for producing high color carbon blacks capable of imparting superior tone, color, gloss and viscosity stability to the enamel systems in which they are utilized.

Still other objects of the present invention will in part be obvious or appear hereinafter.

The above objects are accomplished in accordance with the present invention by aftertreating a carbon black having a rather limited range of particular properties according to a series of certain conditions and procedures until definite changes in properties and surface characteristics have been produced. More precisely we have discovered that a surprisingly superior high color black may be produced by first reacting a carbon black having a particle diameter above a certain size with molecular oxygen to increase the surface porosity of the black to a certain minimum value and then subsequently subjecting the so reacted black to additional treatment with additional chemical oxidizing agents in a liquid phase to impart distinct surface properties thereto without further significant effect on surface porosity. Moreover, we have found that although the types of treatment involved in our process are all known separately in a general sense, the unique combination and sequence of application thereof to particular blacks produces a surprisingly superior color black which is not obtained in any other known manner. Accordingly, the critical features of our invention and the novelty thereof reside in both the specific properties of the carbon black utilized as a starting material and the specific manners and degrees of subsequently aftertreating same to produce blacks which are surprisingly superior to present high color blacks, especially when they are utilized as color pigments in enamel systems.

In the first step of our process we react a specific black with molecular oxygen to produce an intermediate product having certain definite surface properties, especially a controlled level of porosity. The critical features of our starting material are best defined by the porosity and particle size thereof. For the purposes of the present invention, the porosity of a black is the difference obtained by deducting from the nitrogen surface area of a black (determined by the method of Brunauer-Emmett-Teller) that surface area of the black obtained by calculating same from the observed average electron microscope particle diameter according to the following formula:

Square meter per gram $$= \frac{60,000}{1.82} \text{(E.M. particle diameter in angstroms)}$$

The difference obtained is generally believed by those well skilled in the art to be primarily due to the presence of small openings or pores in the surface of the black.

We have found that th estarting material for this invention should be a black having a nigrometer scale above 72, an average electron microscope particle diameter of not less than about 15 millimicrons, and a porosity of not over about 200. In particular, we have found that an especially suitable starting material is a channel black having a scale between 75 to 80, an average electron microscope particle diameter of between 16 to 20 millimicrons and a porosity between 40 and 200. These porosity figures correspond generally to nitrogen surface areas between about 200 and about 400 square meters per gram.

The aftertreatment of carbon blacks with molecular oxygen is old and well known and is usually accomplished by aftertreating a carbon black with air at temperatures from 950° F. to 1050° F., although gaseous mixtures containing more or less than 20% molecular oxygen can also be used if desired. Generally, such molecular oxygen aftertreatment burns away a portion of the black, thus tending to yield blacks of lower nigrometer scale, and higher nitrogen surface areas than the blacks initially subjected thereto. We have found that the initial step in the present invention of aftertreating with molecular oxygen should be of sufficient intensity and duration to increase the porosity of the black to a value of at least 220 but not more than 400. Obviously, for those blacks having low initial porosities the degree of aftertreatment to produce satisfactory intermediate products must be more rigorous and prolonged to raise the porosity thereof to the required range; accordingly, the use of such blacks in this invention is less attractive from a commercial standpoint.

When blacks of the above-mentioned properties are aftertreated with molecular oxygen to produce blacks having porosities between 220 and 400, the resulting intermediate product generally has properties conforming to the following:

|  | Range | Preferred |
| --- | --- | --- |
| Scale | 70–76 | 71–74 |
| Volatile content (percent) | 6–12 | 8–11 |
| Apparent density (lbs./ft.$^3$) | 5–25 | 10–20 |
| $N_2$ surface area (m.$^2$/gm.) | 430–600 | 450–550 |
| Average electron microscope particle diameter (millimicrons) | 14–18 | 15–17 |
| Porosity | 220–400 | 250–350 |

It will be obvious to those well skilled in the art that the above required properties of this intermediate product conform generally to those of a medium rather than a high color black. We have discovered that only those molecular oxygen aftertreated blacks of the above-mentioned critical properties may be further chemically aftertreated according to the practice of our invention to produce pigments which impart superior tone and jetness and outstanding viscosity stability to enamel systems in which they are utilized. For example, we have found that, if a black having an average diameter below 14 and a porosity above 400 is air aftertreated, a satisfactory finished pigment will not result from the second aftertreatment step of our process. As will be illustrated hereinafter, such finished pigments would impart a brown tone to enamel systems in which they are utilized rather than the desirable blue tones obtained by our products.

In the second step of our process we treat a fluid slurry of a molecular oxygen aftertreated carbon black of the aforementioned critical properties with nitric acid and/or nitric oxides. Because such treatment does not alter to any significant degree the porosity of the so treated black but merely alters the surface characteristics thereof, we believe that the nature of the change effected on the surface of the intermediate black by the above-mentioned oxidizing agents is important. Moreover, we have found that the degree of secondary aftertreatment with the above-mentioned oxidizing agents which imparts the improved properties to our final product is best measured by the increase in the volatile content thereof. More precisely we have found that a degree of chemical aftertreatment which increases volatile content by about 40 to about 140% over that of the intermediate product i.e. to a final figure of about 8 to 24% volatile content by weight, is generally sufficient to guarantee the surprising improvements obtained with our final black. In limited cases substantially higher volatile contents may be obtained but usually the jetness of the final black and the tone imparted thereby to enamel systems are somewhat adversely affected. As stated, the other analytical properties of the black discussed above, including the porosity and scale thereof but with the exception of the density thereof, are generally not significantly altered by our secondary aftertreatment step. The final density is usually increased somewhat as a result of our second aftertreatment step. It should be noted that the above stated requirement of a minimum increase of at least about 40% in volatile content over that of the intermediate product means that at least $$\frac{40}{100+40} \times 100$$

or about 28.5% of the total volatiles on said black must be derived from an oxidizing treatment other than molecular oxygen at elevated temperatures.

Many manners of aftertreating of carbon blacks with nitric acid and nitric oxides are known to those well skilled in the art. However, we have found that the superior pigments obtained in accordance with our invention are only obtained by reacting a fluid slurry of the molecular oxygen aftertreated black of the aforementioned properties with the said chemical oxidizing agent.

The final chemical aftertreating step of our process is most effective when from 5 to 60 parts by weight of black are slurried in aqueous $HNO_3$ varying in concentrations from 10% to 70% by weight and reacted for from 5 minutes to several hours at temperatures from room temperature to about 200° F. and thereafter heating the product at temperatures from 200° F. to 300° F. until dry. Preferably the drying is completed within 5 to 15 hours. We have further found that operation within certain ranges of the above variables produces a final product of optimum properties. For example, an increase in acid concentration in the slurry from 10% to 50% produces a black of darker color. Also optimum color is obtained when the concentration of black in the acid slurry is between 35% to 40%. Accordingly, we strongly prefer the following as the conditions of aftertreatment with nitric acid: a 20–40% acid concentration in the slurry, for 20–40 minutes treatment time, at a 25–50% black loading in the slurry, and thereafter heating the so treated black at 250° F., until dry and adsorbed excess nitrogen oxides have been expelled.

Satisfactory chemical aftertreatment of our intermediate black may also be effected by introducing vaporous nitric acid and/or vaporous nitric oxides to an aqueous slurry of black so as to provide concentrations of $HNO_3$ equivalent to those described above.

In accordance with the practice of the above-mentioned preferred reaction conditions of the second step of our process, a pigment conforming to the following properties is obtained.

|  | Range | Preferred |
| --- | --- | --- |
| Scale | 70–76 | 72–73 |
| Apparent density (lbs./ft.$^3$) | 15–35 | 25–30 |
| Volatile content (percent) | 8–24 | 15–20 |
| $N_2$ surface area (m.$^2$/gm.) | 430–600 | 450–550 |
| Average electron microscope particle diameter (millimicrons) | 14–18 | 15–17 |
| Porosity | 220–400 | 250–350 |

We have found that enamels having superior tone and jetness and outstanding viscosity stability are obtained when a pigment of the above properties or of properties substantially similar thereto and obtained in the manner as herein before described are utilized as the color pigment therein.

The following examples are presented for the purpose of illustrating manners of practicing our invention and the superior results obtained by the use of the products produced thereby. These examples are illustrative in nature and in no way are they to be construed to limit our invention to any extent beyond that imposed by the present application and claims.

EXAMPLE 1

600 grams of Monarch 74, a channel black produced by Cabot Corporation and having a nitrogen surface area of 320 square meters per gram, an average electron microscope particle diameter of 17 millimicrons and accordingly a porosity of about 130, were air aftertreated by passing 20 cubic feet of air per hour thereover while the black was slowly rotated in a 6 inch diameter by 12 inch long cylinder maintained at 1000° F. for 6 hours. The so air aftertreated black had the following properties:

Scale _____ 74.5
Apparent density (lbs./ft.$^3$) _____ 10
Volatile content (percent) _____ 10
$N_2$ surface area (m.$^2$/gm.) _____ 500
Average electron microscope particle diameter (millimicrons) _____ 15
Porosity _____ 284

Various concentrations of the above air aftertreated black were further treated by slurrying same with aqueous nitric acid solutions of various concentrations for various lengths of time and at various temperatures. The so treated blacks were subsequently heated until dry and the following data were obtained:

Table A

| No. | Black conc. in slurry, percent | $HNO_3$ conc. in liquid phase, percent | Reaction time (min.) | Temp. reaction (° F.) | Drying time (hours) | Drying temp. (° F.) | Scale | Percent vol. |
|---|---|---|---|---|---|---|---|---|
| 1 | 50 | 15 | 30 | 80 | 16 | 230 | 71.5 | 27.2 |
| 2 | 10 | 15 | 30 | 80 | 16 | 475 | 74.4 | 13.6 |
| 3 | 10 | 50 | 30 | 80 | 16 | 230 | 74.3 | 19.0 |
| 4 | 10 | 15 | 30 | 80 | 24 | 230 | 73.8 | 15.7 |
| 5 | 10 | 40 | 30 | 80 | 16 | 230 | 73.4 | 16.9 |
| 6 | 10 | 15 | 30 | 80 | 16 | 230 | 74.7 | 14.8 |
| 7 | 20 | 40 | 30 | 80 | 16 | 230 | 72.4 | 16.1 |

The above blacks were compounded into a standard enamel formulation described below. Also in order to illustrate the superiority of the blacks produced in accordance with our invention, similar enamel formulations were prepared in which the following three blacks were utilized as pigments; the air aftertreated Monarch 74 from step one of this example, a conventional high color black known as Black Pearls 46 produced by Cabot Corporation and having a volatile content of about 14%, a nitrogen surface area of 800 meters$^2$ per gram and an average electron microscope particle diameter of about 13 millimicrons and a black prepared by aftertreating Black Pearls 2 a high color black produced by Cabot Corporation and having a volatile content of about 13%, an average electron microscope particle diameter of about 13 millimicrons and a nitrogen surface area of about 850 square meters per gram with nitric acid of 10% $HNO_3$ concentration at a temperature of 80° F. for 30 minutes and thereafter heating the black till dry. The resulting Black Pearls 2 had a volatile content of about 20%.

The paint formulation in which the above-mentioned blacks were incorporated is as follows.

[Grinding time 20 hours]

Mill paste: Grams
Aroplaz 2580–X60 (Aroplaz 2580–X60 is a short oil, non-drying alkyd resin manufactured by Archer-Daniels-Midland Co.) ___ 127.2
Resimine 876 (Resimine 876 is a butylated melamine formaldehyde resin manufactured by Monsanto Chemical Co.) _____ 64.8
Solvesso 150 (Solvesso 150 is a medium range, aromatic petroleum solvent manufactured by Enjay Chemical Co.) _____ 50.0
Black _____ 23.4
    ─────
    265.4

1st reduction: 139.2 grams Aroplaz 2580–X60, reduction time ½ hour

2nd reduction: 130.3 grams Aroplaz 2580–X60
3rd reduction:
  41.7 grams ethyl acetate
  41.7 grams butyl alcohol
  11.0 grams Solvesso 150
  160.6 grams Resimine 876
  54.0 grams Aroplaz 2580–X60
  0.1 gram diethylamine The enamel properties were determined as follows:

Viscosity stability of the enamels was determined by measuring the viscosity of the enamel initially and also after an accelerated aging process which consisted of maintaining the enamel at 140° F. for 16 hours.

Color and tone were determined on glass panel drawdowns of the enamels using the "Coloreye" produced by Instrument Development Laboratories, Inc., of Attleboro, Massachusetts, and described in detail in their "Instruction Manual No. 1000 G for Model D Coloreye."

The "Coloreye" measures light reflectance of a sample compared to a standard at three wavelengths in the visible light spectrum. The standard used in this study was an enamel containing Carbolac 46 as the pigment. The lower reflectivity readings are considered the most desirable since lower reflectivity indicates greater absorption and darker color. Tone was determined by measuring reflectance at the three wavelengths:

X=red, Y=green, Z=blue

The tone of a particular enamel is obtained in accordance with the procedure described on pages 18, 19 and 20 of the above-mentioned "Manual." Essentially the procedure involves plotting the X, Y and Z readings obtained on a special graph paper wherein the X, Y and Z axis are arranged parallel to each other. One of the following three types of curves result:

(a) Convex upward with a maximum at the top
(b) Convex downward with a valley
(c) Slanting up either to right or left For curves of the convex upward type, the sample had a tone of the shade appearing directly above the peak. Where a valley occurred, the sample tone appeared directly below the valley. On curves going up to right or left, the sample tone was the shade toward which the curve rises.

Table B

| Enamel No. | Black | Enamel color | | | | | | Tone | Viscosity (sec.) | | Change in viscosity |
|---|---|---|---|---|---|---|---|---|---|---|---|
| | | Unaged | | | Aged | | | | Unaged | Aged | |
| | | X | Y | Z | X | Y | Z | | | | |
| | Black pearls 46 | 120 | 120 | 115 | | | | Blue | 41 | 61 | 20 |
| | $HNO_3$ aftertreated black pearls 2 | | | | | | | Brown | 26 | 29 | 3 |
| E-927 | Air aftertreated monarch 74 | 155+ | 155+ | 146+ | 155+ | 155+ | 150+ | Blue | 33 | 59 | 26 |
| E-931 | 1 (Table A) | 80.8 | 78.0 | 74.5 | 81.0 | 78.2 | 73.4 | Red | 30.5 | 35 | 4.5 |
| E-932 | 2 (Table A) | 93.3 | 93.0 | 93.3 | 95.0 | 94.3 | 94.0 | Purple | 30 | 35.5 | 5.5 |
| E-933 | 3 (Table A) | 78.8 | 77.8 | 77.2 | 77.7 | 76.8 | 77.0 | Blue | 30.5 | 35.5 | 5.0 |
| E-934 | 4 (Table A) | 95.8 | 94.6 | 94.3 | 88.4 | 87.3 | 87.8 | do | 32.5 | 37.0 | 4.5 |
| E-937 | 5 (Table A) | 79.3 | 78.6 | 79.3 | 80.8 | 79.5 | 80.0 | do | 31.0 | 36.0 | 5.0 |
| E-942 | 6 (Table A) | 81.8 | 81.0 | 80.9 | 81.3 | 75.8 | 76.3 | do | 32.8 | 36.0 | 3.2 |
| E-944 | 7 (Table A) | 82.0 | 80.8 | 81.8 | | | | do | 31.5 | | |
| | 8 (Table A) | 89.5 | 89.2 | 88.2 | | | | do | 31.0 | | |

It is obvious from the above data that not only are significant improvements noted in the color and tone properties of the blacks treated in accordance with our process but outstanding improvements in viscosity stability are also obtained therewith. However, it should be noted that, although the viscosity stability of such blacks is improved in all cases, nevertheless, certain conditions of treatment do not appear to also impart the ultimate desirable improvements in the tone or color of the so treated black. For example, note the enamels E–931 and E–932 produced from blacks 1 and 2 of the Table A. These particular blacks were treated with $HNO_3$ in such a manner that the final % volatile thereof was greater than a 140% increase in the case of black #1 and less than a 40% increase in the case of black #2. In both cases, the tone appears to have been adversely affected, since the blue tone is the most desirable especially in enamel systems for automotive finishes.

EXAMPLE 2

500 lbs. of a carbon black having a nitrogen surface of 380 square meters per gram and an average electron microscope particle diameter of 16 millimicrons and accordingly a porosity of about 178 were air aftertreated by continually passing air thereover while the black was slowly rotated in a cylinder maintained at a temperature of about 1000° F. for about 4 hours. The so air aftertreated black had the following properties.

| | |
|---|---|
| Scale | 70 |
| Apparent density (lbs./ft.$^3$) | 20 |
| Volatile content (percent) | 10 |
| $N_2$ surface area (m.$^2$/gm.) | 550 |
| Average electron microscope particle diameter (millimicrons) | 15 |
| Porosity | 334 |

A sample of a carbon black prepared in the above-described manner was slurried with nitric acid in a 25 r.p.m. pelletizer for 30 minutes at a temperature of 90° F. The concentration of the black in the slurry was 47.6% and the concentration of the $HNO_3$ in the liquid phase was 11.8%. Thereafter, the black was heated at a constant temperature of 275° F. for 9 hours in a drum dryer slowed to 30 r.p.m. The pigment produced had a nigrometer scale of 70.0, a percent volatile of 17.1% and a density of 33.3 lbs./ft.$^3$. When this pigment was incorporated into the enamel formulation of Example 1, the resulting enamel had excellent jetness, mass tone, gloss and viscosity stability.

EXAMPLE 3

A carbon black having a nitrogen surface area of about 180 m.$^2$/gm. and an average electron microscope diameter of about 20 millimicrons and accordingly a porosity of about 36 was air aftertreated by passing 25 cubic feet of air per hour thereover while the black was slowly rotated in a 6 inch diameter by 12 inch long cylinder maintained at 1200° F. for 8 hours. The so air aftertreated black had the following properties:

| | |
|---|---|
| Scale | 73.2 |
| Apparent density (lbs./ft.$^3$) | 15 |
| Percent volatile | 9 |
| $N_2$ surface area (m.$^2$/gm.) | 480 |
| Average elecrton microscope particle diameter (millimicrons) | 17 |
| Porosity | 299 |

Thereafter, a slurry was formed containing 25% by weight of the aftertreated black using 20% $HNO_3$ by weight in the aqueous liquid phase and agitated for 40 minutes at a temperature of 70° F. The mixture was then heated in a drum type dryer turning at 3.3 revolutions per hour for 8 hours at a constant temperature of 190° F. The final pigment had a nigrometer scale of 72.4%, a percent volatile of 15.7 and a density of 25 lbs./ft.$^3$. An enamel produced with the above pigment and in accordance with the formulation of Example 1 had an excellent blue tone, good mass jetness and gloss and an outstanding degree of viscosity stability.

Since the critical and limitative feature of our invention are the particular type and degree of two-step aftertreating of specific carbon blacks to produce superior high color blacks, many variations in the incidental features and methods thereof may be permitted without departing from the spirit and scope of our invention.

Having described our invention what we declare as new and desire to secure by U.S. Letters Patent is as follows:

1. A process for producing pigments comprising treating a carbon black having an average electron microscope particle diameter of at least about 15 millimicrons and a porosity below about 200 with molecular oxygen at elevated temperatures to produce an intermediate product having a porosity between about 220 and 400, reacting an aqueous slurry of the said intermediate product with an oxidizing agent chosen from the group consisting of nitric acids and nitric oxides to increase the volatile content of said intermediate product by at least 40% and heating the so produced pigment until substantially dry.

2. The process of claim 1 in which the said carbon black is a channel black.

3. The process of claim 1 in which the concentration of the said aftertreated black in the slurry is between 25% and 50% by weight of the slurry.

4. The process of claim 1 in which the concentration of the said oxidizing agent in the said slurry is between 20% to 40% of the weight of the slurry.

5. A process for producing pigments comprising treating a carbon black having an average electron microscope particle diameter between 15 and 20 millimicrons and a porosity below about 200 with molecular oxygen at elevated temperatures to produce an intermediate product having a porosity between about 220 and 400, and thereafter reacting a slurry of said intermediate black with an oxidizing agent chosen from the group consisting of nitric acid and nitrogen oxides for a time sufficient to increase the volatile content of said intermediate black by at least 40% to about 140% and heating the so produced pigment until substantially dry.

6. The process of claim 5 in which the said carbon black is a channel black.

7. The process of claim 5 in which the concentration of the said intermediate black in the slurry is between 25% to 50% by weight of the slurry.

8. The process of claim 5 in which the concentration of the said oxidizing agent in the said slurry is between 20% to 40% of the weight of the slurry.

References Cited by the Examiner

UNITED STATES PATENTS

| | | | |
|---|---|---|---|
| Re. 19,664 | 8/1935 | Damon | 23—209.9 |
| 2,420,810 | 5/1947 | Bray et al. | 23—209.2 X |
| 3,023,118 | 2/1958 | Donnet | 23—209.1 X |

OTHER REFERENCES

Duffy: "Channel and Furnace Carbon Blacks," Official Digest, June 1949, pages 347–352.

MAURICE A. BRINDISI, *Primary Examiner.*